(12) United States Patent
Larner

(10) Patent No.: US 9,802,568 B1
(45) Date of Patent: Oct. 31, 2017

(54) INTERLOCKING VEHICLE AIRBAGS

(71) Applicant: Waymo LLC, Mountain View, CA (US)

(72) Inventor: Daniel Lynn Larner, San Jose, CA (US)

(73) Assignee: Waymo LLC, Mountain View, CA (US)

( * ) Notice: Subject to any disclaimer, the term of this patent is extended or adjusted under 35 U.S.C. 154(b) by 0 days.

(21) Appl. No.: 14/845,410

(22) Filed: Sep. 4, 2015

(51) Int. Cl.
B60R 21/36 (2011.01)
B60R 21/0134 (2006.01)
B60R 21/01 (2006.01)

(52) U.S. Cl.
CPC .......... B60R 21/36 (2013.01); B60R 21/0134 (2013.01); B60R 2021/01211 (2013.01); B60R 2021/01286 (2013.01)

(58) Field of Classification Search
None
See application file for complete search history.

(56) References Cited

U.S. PATENT DOCUMENTS

| 5,377,108 A | 12/1994 | Nishio |
| 5,430,649 A | 7/1995 | Cashler et al. |
| 5,446,661 A | 8/1995 | Gioutsos et al. |
| 5,899,946 A | 5/1999 | Iyoda |
| 5,959,552 A | 9/1999 | Cho |
| 6,076,854 A | 6/2000 | Schenck et al. |
| 6,085,151 A | 7/2000 | Farmer et al. |
| 6,106,038 A * | 8/2000 | Dreher ................. B60R 19/205 293/107 |
| 6,139,052 A * | 10/2000 | Preamprasitchai ..... B60R 21/16 280/729 |
| 6,188,940 B1 | 2/2001 | Blackburn et al. |
| 6,394,490 B2 | 5/2002 | Osmer et al. |
| 6,439,330 B1 | 8/2002 | Paye |
| 6,470,272 B2 | 10/2002 | Cong et al. |

(Continued)

FOREIGN PATENT DOCUMENTS

DE 102010019592 A1 11/2011

OTHER PUBLICATIONS

Predictive Mover Detection and Tracking in Cluttered Environments, 9 pgs. (2006).

(Continued)

Primary Examiner — Krishnan Ramesh
(74) Attorney, Agent, or Firm — Lerner, David, Littenberg, Krumholz & Mentlik, LLP

(57) ABSTRACT

Aspects of the disclosure relate to airbag systems for vehicles having interlocking airbags. An example airbag system may include a first airbag having a first shape and a second airbag having a second shape. The first shape and the second shape are configured to interlock with one another in order to reduce the likelihood of an object passing between the first airbag and the second airbag when the first and second airbags are inflated. In addition, the first airbag and second airbag are arranged to deploy on an exterior of the vehicle. An airbag system can also include one or more processors configured to determine that an impact with an object is likely to occur within a predetermined period of time. These processors can also use the determination to send a first signal to deploy the first airbag and a second signal to deploy the second airbag.

20 Claims, 12 Drawing Sheets

(56) References Cited

U.S. PATENT DOCUMENTS

| | | |
|---|---|---|
| 6,650,983 B1 | 11/2003 | Rao et al. |
| 6,702,320 B1 | 3/2004 | Lang et al. |
| 6,749,218 B2 | 6/2004 | Breed |
| 6,755,453 B2 | 6/2004 | Kellas |
| 6,775,605 B2 | 8/2004 | Rao et al. |
| 6,776,436 B2 | 8/2004 | Takagi et al. |
| 6,819,991 B2 | 11/2004 | Rao et al. |
| 6,831,572 B2 | 12/2004 | Strumolo et al. |
| 6,836,714 B1 | 12/2004 | Nitschke et al. |
| 6,851,504 B2 | 2/2005 | Campbell et al. |
| 6,917,305 B2 | 7/2005 | King |
| 7,009,500 B2 | 3/2006 | Rao et al. |
| 7,048,086 B2 | 5/2006 | Yoneda |
| 7,050,606 B2 | 5/2006 | Paul et al. |
| 7,174,985 B2 | 2/2007 | Sawa et al. |
| 7,344,153 B1 | 3/2008 | Manneh et al. |
| 7,350,804 B2 | 4/2008 | Bakhsh et al. |
| 7,506,716 B1 | 3/2009 | Salmon et al. |
| 7,513,524 B2 | 4/2009 | Oota et al. |
| 7,616,101 B2 | 11/2009 | Kuttenberger et al. |
| 7,630,806 B2 | 12/2009 | Breed |
| 7,660,438 B2 | 2/2010 | Camus |
| 7,797,108 B2 | 9/2010 | Grimm |
| 8,041,483 B2 | 10/2011 | Breed |
| 8,447,472 B2 | 5/2013 | Joh et al. |
| 8,463,500 B2 | 6/2013 | Cuddihy et al. |
| 8,474,865 B2 | 7/2013 | Grindle |
| 8,554,461 B2 | 10/2013 | Cuddihy et al. |
| 8,594,919 B2 | 11/2013 | Munakata |
| 8,655,537 B2 | 2/2014 | Ferguson et al. |
| 8,700,257 B2 | 4/2014 | Tamura et al. |
| 8,801,035 B2 | 8/2014 | Kim et al. |
| 8,947,532 B2 | 2/2015 | Augst |
| 9,061,638 B2 | 6/2015 | Sievers et al. |
| 9,517,767 B1 | 12/2016 | Kentley et al. |
| 9,630,619 B1 | 4/2017 | Kentley et al. |
| 2003/0155750 A1* | 8/2003 | Hu ........................ B60R 19/205 280/730.1 |
| 2004/0069555 A1 | 4/2004 | Yoneda |
| 2004/0102984 A1 | 5/2004 | Wahlbin et al. |
| 2005/0151393 A1 | 7/2005 | Borg et al. |
| 2006/0031015 A1 | 2/2006 | Paradie |
| 2006/0255573 A1* | 11/2006 | Tobata .................... B60R 21/18 280/733 |
| 2006/0278461 A1 | 12/2006 | Shen et al. |
| 2006/0282218 A1 | 12/2006 | Urai et al. |
| 2009/0010495 A1 | 1/2009 | Schamp et al. |
| 2009/0248253 A1 | 10/2009 | Le et al. |
| 2009/0326766 A1 | 12/2009 | Wang |
| 2010/0230944 A1* | 9/2010 | Narita .................... B60R 21/36 280/741 |
| 2015/0000994 A1 | 1/2015 | McLundie |
| 2015/0177007 A1 | 6/2015 | Su et al. |
| 2015/0274107 A1 | 10/2015 | Le et al. |
| 2016/0059823 A1 | 3/2016 | Jayasuriya et al. |

OTHER PUBLICATIONS

Airbag, Wikipedia, [Retrieved from the Internet Jun. 25, 2015, 21 pgs.; https://en.wikipedia.org/?title=Airbag].

* cited by examiner

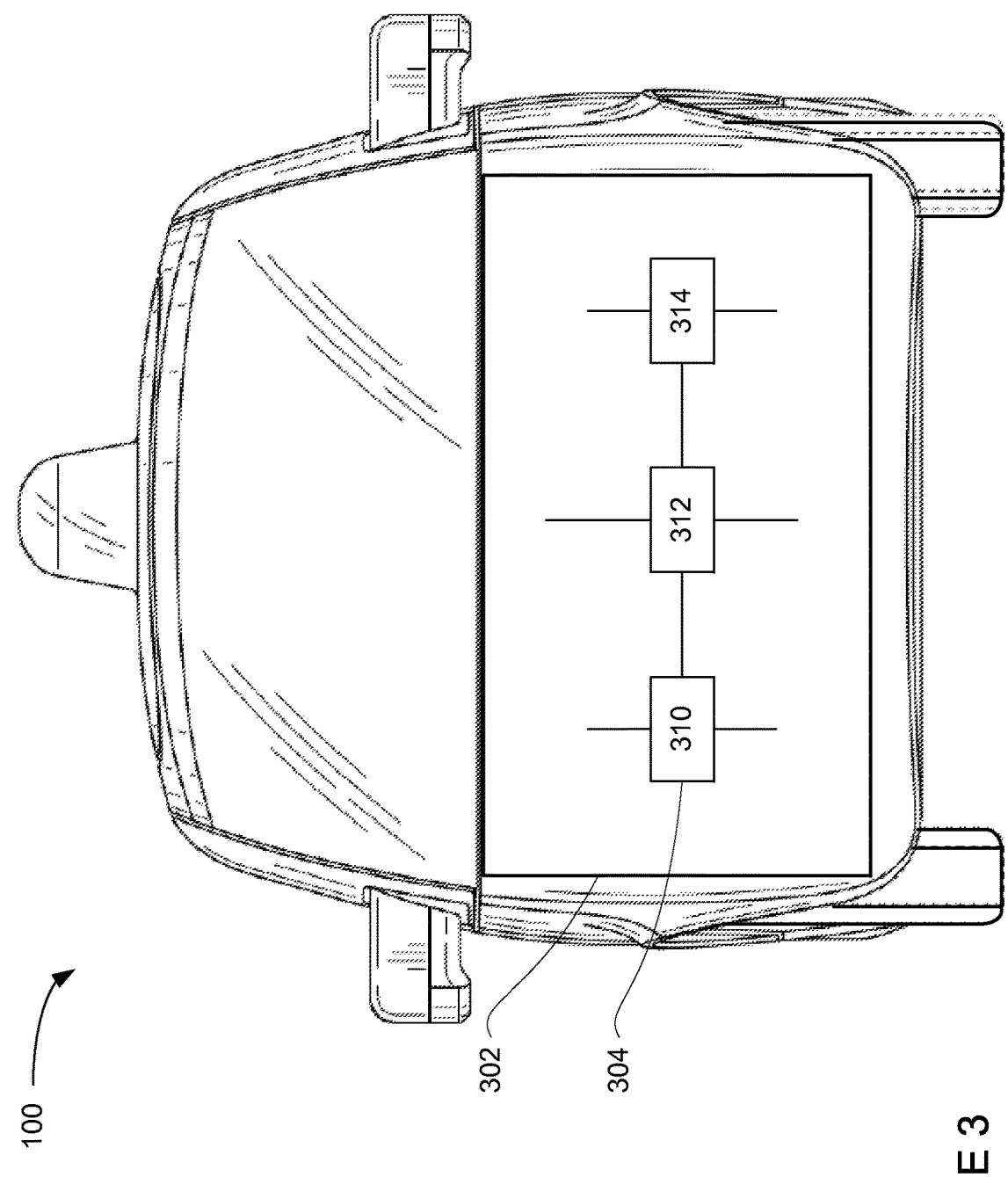

INTERLOCKING VEHICLE AIRBAGS

BACKGROUND

Autonomous vehicles, such as vehicles that do not require a human driver, can be used to aid in the transport of passengers or items from one location to another. Such vehicles may operate in a fully autonomous mode where passengers may provide some initial input, such as a pick up or destination location, and the vehicle maneuvers itself to that location.

An important component of an autonomous vehicle is the perception system, which allows the vehicle to perceive and interpret its surroundings using cameras, radar, sensors, and other similar devices. Data from the perception system is then used by the autonomous vehicle's computer to make numerous decisions while the autonomous vehicle is in motion, such as decide when to speed up, slow down, stop, turn, etc. These decisions are used to maneuver between locations but also to interact with and avoid collisions with other objects along the way.

When a collision actually occurs, non-autonomous and autonomous vehicles alike may include various safety mechanisms to reduce injury to passengers. Typically, the safety mechanisms may include airbag systems employed to protect passengers from impacts with the interior of a vehicle after an object external to a vehicle has impacted a bumper of the vehicle.

BRIEF SUMMARY

One aspect of the disclosure provide an airbag system for a vehicle. The system includes a first airbag having a first shape and a second airbag having a second shape. The first shape and the second shape are configured to interlock with one another in order to reduce the likelihood of an object passing between the first airbag and the second airbag when the first and second airbags are inflated.

In one example, the first airbag and second airbag are arranged to deploy on an exterior of the vehicle. In another example, the system also includes one or more computing devices having one or more processors configured to determine, using data from one or more sensors, that an impact with an object is likely to occur within a predetermined period of time; and use the determination to send a first signal to deploy the first airbag and a second signal to deploy the second airbag. In an alternative, the first signal and second signal are sent according to a predetermined sequence such that the first signal and second signal are configured to cause the first airbag and second airbag to deploy at different times according to an expected deployment time for each of the first airbag and the second airbag. In addition, the first and second signals are further configured to cause the first airbag and the second airbag to be fully deployed within an acceptable amount of time from one another.

In another alternative, the one or more processors are further configured to determine, using the data from one or more sensors, an estimated time of the impact, and the first signal and the second signal are configured to cause the first airbag and the second airbag to be fully deployed within an acceptable amount of time of the estimated time of the impact.

In another example, the portions of the first airbag and the second airbag are configured to overlap one another relative to an exterior surface of the vehicle in order to prevent the object from passing between the first airbag and the second airbag and hitting the exterior surface of the vehicle when the first and second airbags are inflated. In this example, the overlapping portions of the first airbag and the second airbag include a connection mechanism configured to hold the overlapping portions to one another when the airbags are inflated and when the airbags are deflating after inflating. In another example, the system also includes the vehicle.

Another aspect of the disclosure provides a method for deploying an airbag system for a vehicle. The method includes deploying a first airbag having a first shape; and subsequent to deploying the first airbag, deploying a second airbag having a second shape such that the first shape and the second shape interlock with one another in order to reduce the likelihood of an object passing between the first airbag and the second airbag when the first and second airbags are inflated.

In one example, the first airbag and second airbag are arranged to deploy on an exterior of the vehicle. In another example, the method also includes determining, by one or more processors, using data from one or more sensors, that an impact with an object is likely to occur within a predetermined period of time; and using, by the one or more processors, the determination to send a first signal in order to deploy the first airbag and a second signal in order to deploy the second airbag. In an alternative, the first signal and second signal are sent according to a predetermined sequence such that the first signal and second signal are configured to cause the first airbag and second airbag to deploy at different times according to an expected deployment time for each of the first airbag and the second airbag. In addition, the first and second signals are deployed in order to cause the first airbag and the second airbag to be fully deployed within an acceptable amount of time from one another.

In another alternative, the method also includes determining, by the one or more processors, using the data from one or more sensors, an estimated time of the impact, and the first signal and the second signal are configured to cause the first airbag and the second airbag to be fully deployed within an acceptable amount of time of the estimated time of the impact.

In another example, the first air bag and the second airbag are deployed such that portions of the first airbag and the second airbag are configured to overlap one another relative to an exterior surface of the vehicle in order to prevent the object from passing between the first airbag and the second airbag and hitting the exterior surface of the vehicle when the first and second airbags are inflated. In this example, the overlapping portions of the first airbag and the second airbag include a connection mechanism configured to hold the overlapping portions to one another when the airbags are inflated and when the airbags are deflating after inflating.

A further aspect of the disclosure provides a non-transitory computer readable medium on which instructions are stored. The instructions, when executed by one or more processors, cause the one or more processors to perform a method. The method includes deploying a first airbag having a first shape, and subsequent to deploying the first airbag, deploying a second airbag having a second shape such that the first shape and the second shape interlock with one another in order to reduce the likelihood of an object passing between the first airbag and the second airbag when the first and second airbags are inflated.

In one example, the method also includes determining using data from one or more sensors, that an impact with an object is likely to occur within a predetermined period of time, and using the determination to send a first signal to deploy the first airbag and a second signal to deploy the second airbag. In this example, the first signal and second signal are sent according to a predetermined sequence such that the first signal and second signal are configured to cause the first airbag and second airbag to deploy at different times according to an expected deployment time for each of the first airbag and the second airbag.

BRIEF DESCRIPTION OF THE DRAWINGS

FIG. 3 is an example diagram of a vehicle and an example airbag system in accordance with aspects of the disclosure.

DETAILED DESCRIPTION

Overview

Figure 1:
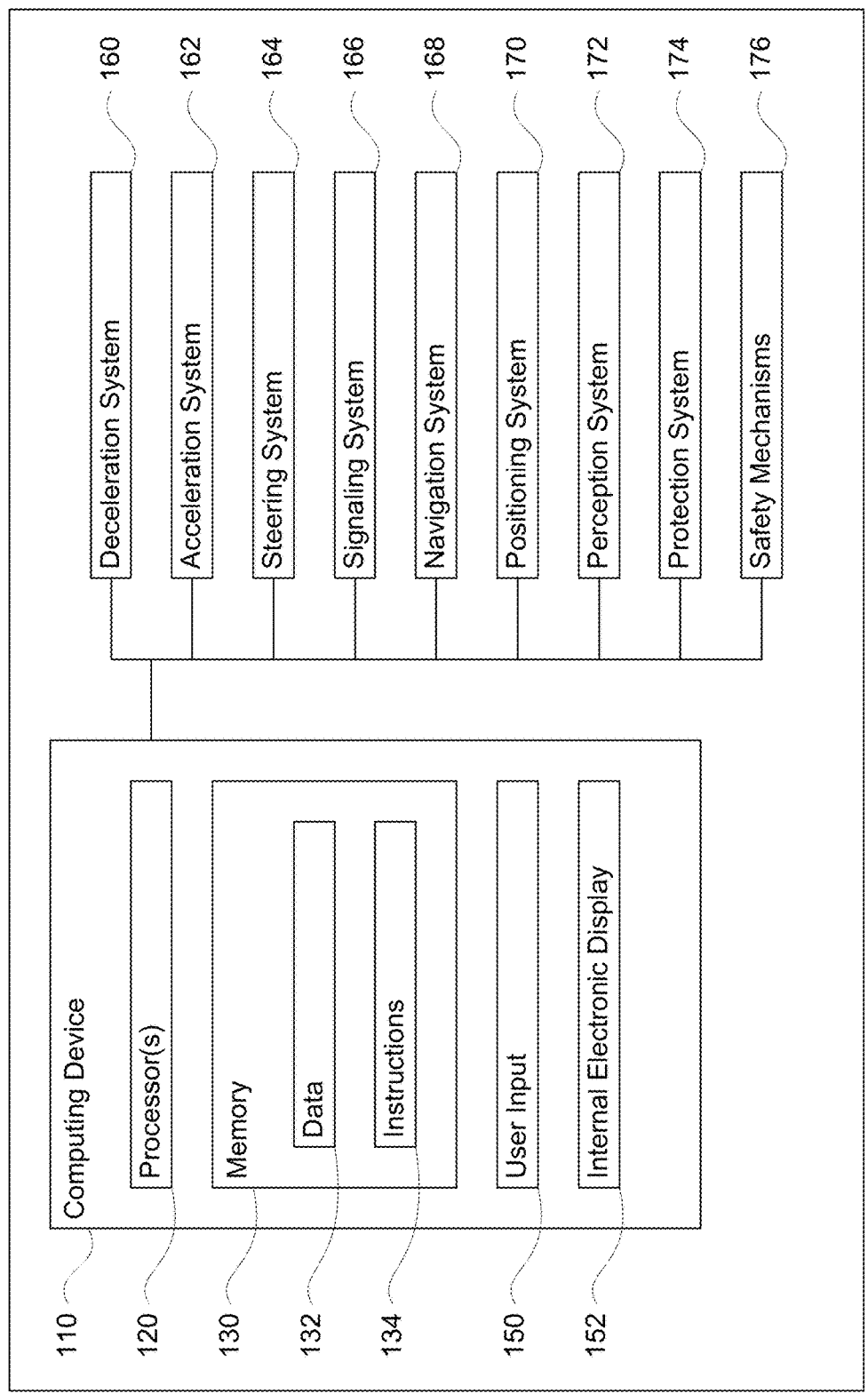
FIG. 1 is a functional diagram of an example vehicle in accordance with an exemplary embodiment.
Figure 2A:
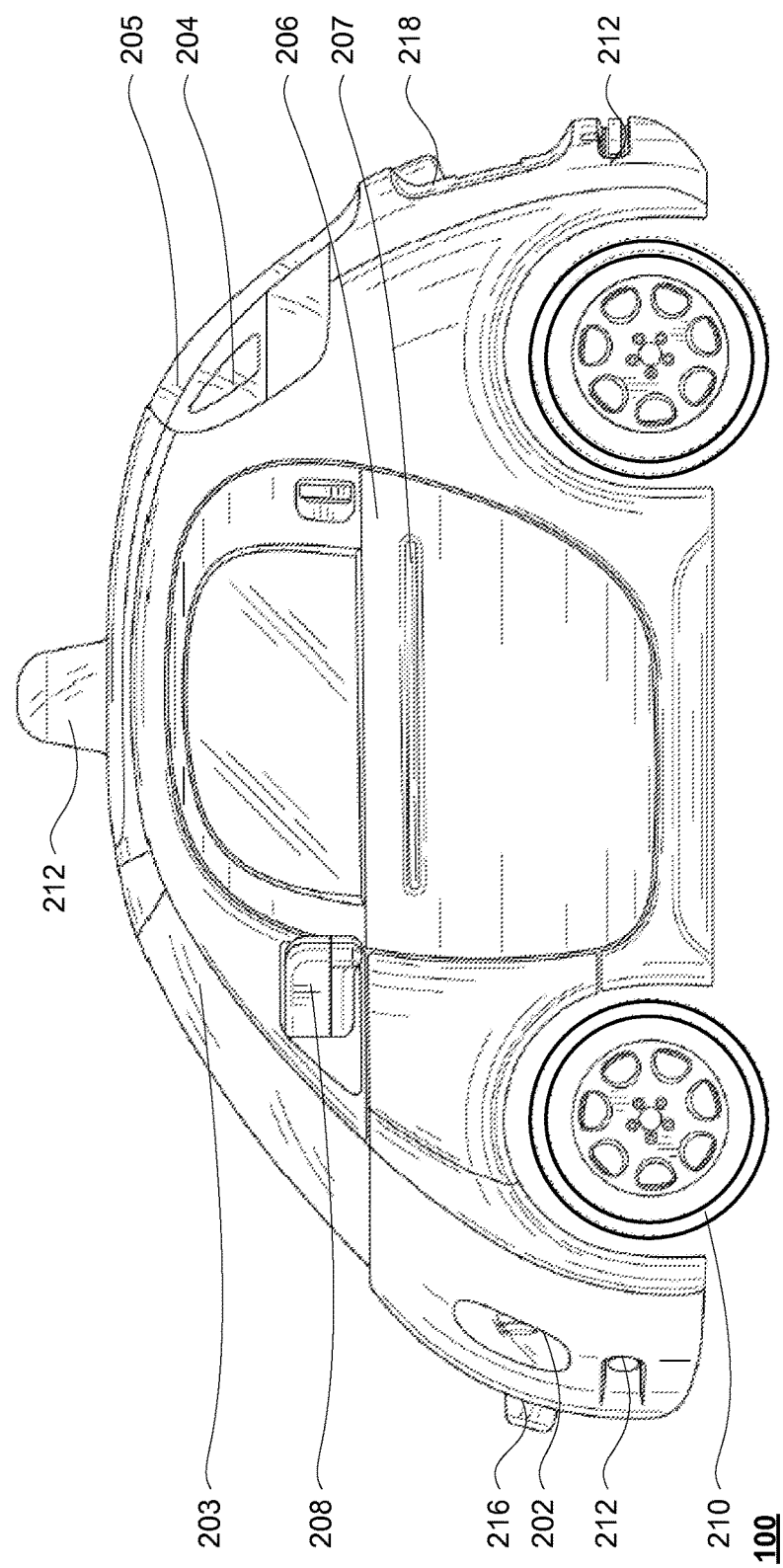
FIGS. 2A-2D are example external views of a vehicle in accordance with aspects of the disclosure.
Figure 2C:
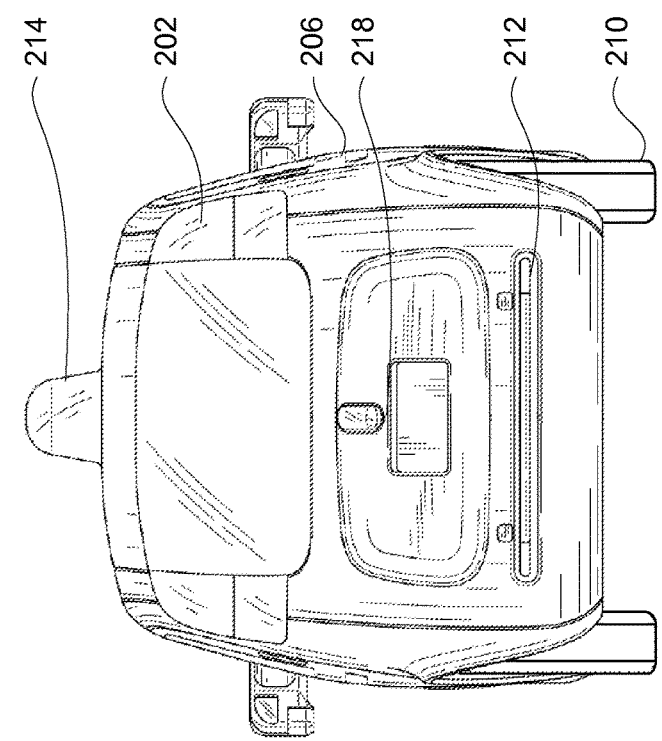
Figure 2B:
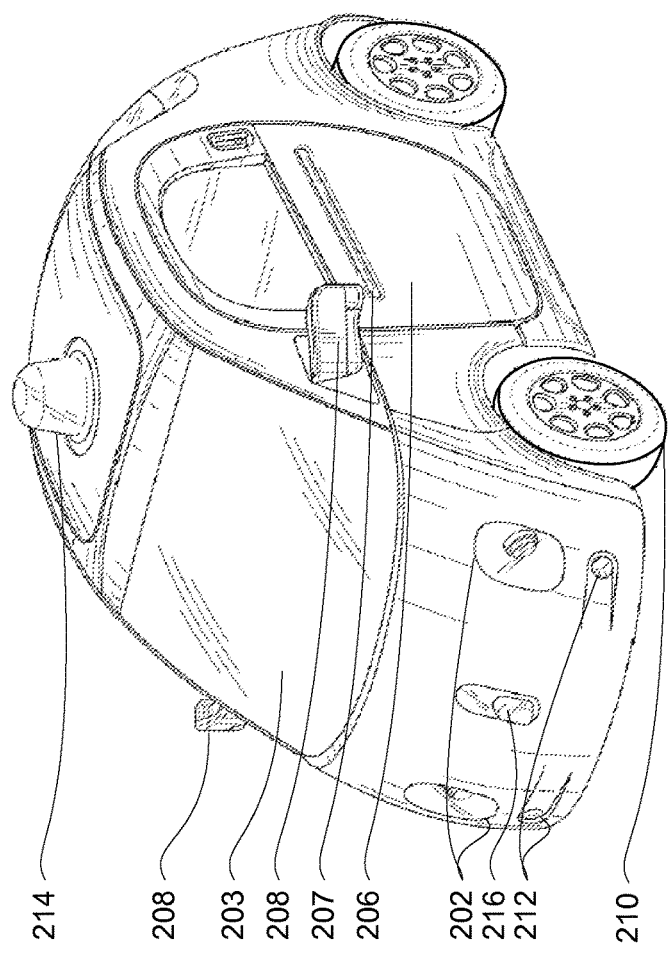
Figure 2D:
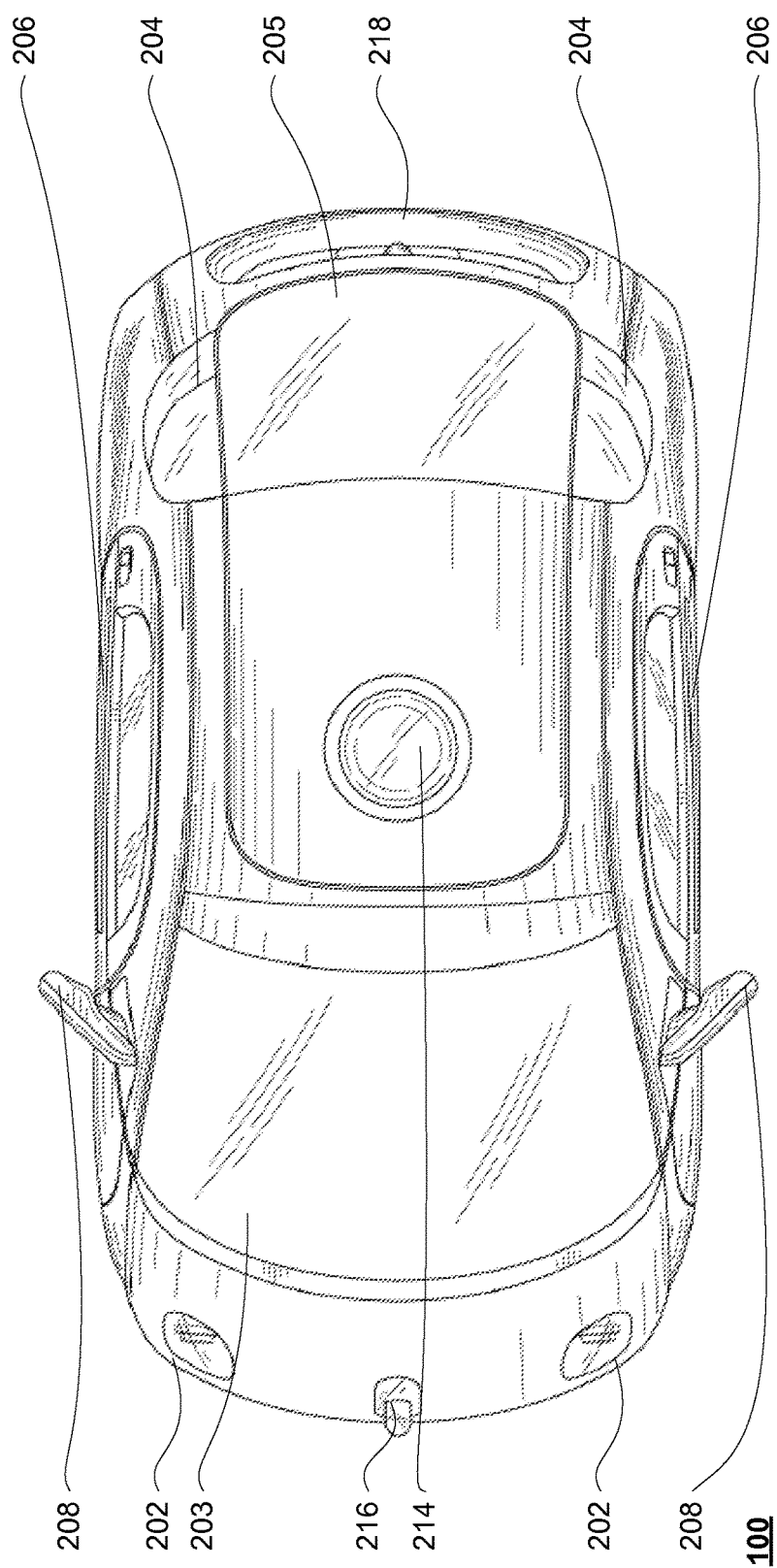

The technology relates to reducing the likelihood of severe injuries or damage to objects such as pedestrians, bicyclists, animals, other vehicles, or simply inanimate objects caused by collisions with autonomous vehicles. While avoiding collisions with other objects is a primary goal for autonomous vehicles, in rare circumstances, there may be an imminent and unavoidable impact. While airbags are typically used to protect passengers within a vehicle, they may also be used to reduce a likelihood of injury to an object external to an autonomous vehicle during a collision with the vehicle.

However, in the case of a passenger within a vehicle, the location and angle of impact of any passengers within the vehicle is generally known as vehicles are typically arranged with seats and seat belts. In this way, multiple airbags can be arranged next to one another in a vehicle during manufacturing of the vehicle and without risk of a passenger going into a gap between the airbags and being injured.

When airbags are used to protect objects externally of the vehicle, because the location and angle of impact are generally unknown when the airbags are being arranged in the vehicle, when multiple airbags are arranged next to one another, there is a risk that the object will move through a gap between the airbags and still impact the vehicle directly. In this regard, the airbags may be arranged to deploy in such a way that the airbags interlock with one another. By doing so, this may significantly reduce the likelihood of an object moving through a gap and impacting the vehicle directly.

In this regard, groups of two or more airbags may be arranged at various positions around the autonomous vehicle where an impact is likely, such as at the front, back and sides of the autonomous vehicle. Each group of two or more airbags may be configured to have interlocking shapes as discussed above. As an example, the interlocking shapes may be arranged such that an airbag of a particular group overlaps at least one other airbag relative to an exterior surface of the vehicle.

As with typical airbags, each of the airbags may include its own deployment mechanism which can be triggered by an electronic signal from one or more of the computing devices of the autonomous vehicle. This signal may trigger ignition of a gas generator propellant to rapidly inflate the airbag. Each airbag may also have its own vent to control the flow of gas out of the airbag after deployment.

In order to maintain the interlocking shape after full deployment when the airbags are venting the gas, the interlocking portions of the airbags may also include mechanisms to hold the interlocking portions to one another, such as tape, glue, hook and loop structures (such as Velcro® or other sticky substances or connectors.

Because of the interlocking shapes of the airbags, in at least some examples, the airbags may be required to deploy in a particular sequence. This may allow the interlocking shapes to fit together like puzzle pieces as opposed to interfering (i.e. getting stuck before fully deploying) with one another during deployment. Thus, the airbags may be configured to deploy one at a time in sequence such that the interlocking airbags are fully inflated or deployed at approximately the same time, for example within a few milliseconds or more or less.

In addition, because of the nature of airbags, namely that they must be triggered to deploy and also take time to deploy, when airbags are placed on the exterior of a vehicle, external airbags need to be triggered before an impact with enough time for the airbag to fully deploy. This may be possible in the case of an autonomous vehicle having a sophisticated perception system highly sophisticated perception system including a plurality of sensors. Data from the sensors may be received and processed by one or more computing devices of the vehicle's perception and/or control systems in real time in order to detect and identify the characteristics (size, speed, shape, direction, object type, etc.) of various objects in the vehicle's environment. The vehicle's one or more control computing devices of the vehicle may use this information to determine whether an impact with any of the detected objects is imminent, or rather, whether the impact is likely to occur within a predetermined period of time, such as a few seconds second or more or less.

Where an autonomous vehicle's computing devices are able to determine that an impact is imminent, the autonomous vehicle's computing devices may work to deploy the airbags in advance of the impact. This may include sending signals to activate the airbags according to the particular sequence so that the interlocking airbags are fully inflated or deployed at approximately the same time and at approximately the time when the impact is predicted to be. In this regard, the vehicle's computing devices may attempt to send signals such that the airbags will be fully deployed at the time of impact or within some acceptable period of time, such as a few milliseconds or more or less before the estimated time of impact. Thus, the one or more computing devices may deploy interlocking airbags according to an expected deployment time for each airbag and an expected time of impact.

Although the features discussed herein relate to interlocking airbags that can be used externally of a vehicle, such features may also be used to protect passengers or other objects within an autonomous vehicle in the event of a collision.

The features described herein may significantly reduce the likelihood of object moving through a gap between two airbags. By doing so, the vehicle can reduce the amount of damage caused to the object, thus increasing the safety of the vehicle and reducing the risk of injury to other objects. In addition, when groups of smaller airbags are used as opposed to larger airbags, the deployment time of the airbags is reduced because smaller bags take less time to fully deploy.

In addition, as discussed in detail below, the features described herein allow for various alternatives.

Example Systems

As shown in FIG. 1, a vehicle 100 in accordance with one aspect of the disclosure includes various components. While certain aspects of the disclosure are particularly useful in connection with specific types of vehicles, the vehicle may be any type of vehicle including, but not limited to, cars, trucks, motorcycles, busses, recreational vehicles, etc. The vehicle may have one or more computing devices, such as computing device 110 containing one or more processors 120, memory 130 and other components typically present in general purpose computing devices.

The memory 130 stores information accessible by the one or more processors 120, including instructions 134 and data 132 that may be executed or otherwise used by the processor 120. The memory 130 may be of any type capable of storing information accessible by the processor, including a computing device-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 134 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The data 132 may be retrieved, stored or modified by processor 120 in accordance with the instructions 134. For instance, although the claimed subject matter is not limited by any particular data structure, the data may be stored in computing device registers, in a relational database as a table having a plurality of different fields and records, XML documents or flat files. The data may also be formatted in any computing device-readable format.

The one or more processor 120 may be any conventional processors, such as commercially available CPUs. Alternatively, the one or more processors may be a dedicated device such as an ASIC or other hardware-based processor. Although FIG. 1 functionally illustrates the processor, memory, and other elements of computing device 110 as being within the same block, it will be understood by those of ordinary skill in the art that the processor, computing device, or memory may actually include multiple processors, computing devices, or memories that may or may not be stored within the same physical housing. For example, memory may be a hard drive or other storage media located in a housing different from that of computing device 110. Accordingly, references to a processor or computing device will be understood to include references to a collection of processors or computing devices or memories that may or may not operate in parallel.

Computing device 110 may all of the components normally used in connection with a computing device such as the processor and memory described above as well as a user input 150 (e.g., a mouse, keyboard, touch screen and/or microphone) and various electronic displays (e.g., a monitor having a screen or any other electrical device that is operable to display information). In this example, the vehicle includes an internal electronic display 152 as well as one or more speakers 154 to provide information or audio visual experiences. In this regard, internal electronic display 152 may be located within a cabin of vehicle 100 and may be used by computing device 110 to provide information to passengers within the vehicle 100.

Computing device 110 may also include one or more wireless network connections 154 to facilitate communication with other computing devices, such as the client computing devices and server computing devices described in detail below. The wireless network connections may include short range communication protocols such as Bluetooth, Bluetooth low energy (LE), cellular connections, as well as various configurations and protocols including the Internet, World Wide Web, intranets, virtual private networks, wide area networks, local networks, private networks using communication protocols proprietary to one or more companies, Ethernet, WiFi and HTTP, and various combinations of the foregoing.

In one example, computing device 110 may be an autonomous driving computing system incorporated into vehicle 100. The autonomous driving computing system may capable of communicating with various components of the vehicle. For example, returning to FIG. 1, computing device 110 may be in communication with various systems of vehicle 100, such as deceleration system 160, acceleration system 162, steering system 164, signaling system 166, navigation system 168, positioning system 170, and perception system 172, and protection system 174 in order to control the movement, speed, etc. of vehicle 100 in accordance with the instructions 134 of memory 130. Again, although these systems are shown as external to computing device 110, in actuality, these systems may also be incorporated into computing device 110, again as an autonomous driving computing system for controlling vehicle 100. As with the computing device 110, each of these systems may also include one or more processors as well as memory storing data and instructions as with processors 120, memory 130, data 132 and instructions 134.

As an example, computing device 110 may interact with deceleration system 160 and acceleration system 162 in order to control the speed of the vehicle. Similarly, steering system 164 may be used by computer 110 in order to control the direction of vehicle 100. For example, if vehicle 100 is configured for use on a road, such as a car or truck, the steering system may include components to control the angle of wheels to turn the vehicle. Signaling system 166 may be used by computing device 110 in order to signal the vehicle's intent to other drivers or vehicles, for example, by lighting turn signals or brake lights when needed.

Navigation system 168 may be used by computing device 110 in order to determine and follow a route to a location. In this regard, the navigation system 168 and/or data 134 may store detailed map information, e.g., highly detailed maps identifying the shape and elevation of roadways, lane lines, intersections, crosswalks, speed limits, traffic signals, buildings, signs, real time traffic information, vegetation, or other such objects and information.

Positioning system 170 may be used by computing device 110 in order to determine the vehicle's relative or absolute position on a map or on the earth. For example, the position system 170 may include a GPS receiver to determine the device's latitude, longitude and/or altitude position. Other location systems such as laser-based localization systems, inertial-aided GPS, or camera-based localization may also be used to identify the location of the vehicle. The location of the vehicle may include an absolute geographical location, such as latitude, longitude, and altitude as well as relative location information, such as location relative to other cars immediately around it which can often be determined with less noise that absolute geographical location.

The positioning system 170 may also include other devices in communication with computing device 110, such as an accelerometer, gyroscope or another direction/speed detection device to determine the direction and speed of the vehicle or changes thereto. By way of example only, an acceleration device may determine its pitch, yaw or roll (or changes thereto) relative to the direction of gravity or a plane perpendicular thereto. The device may also track increases or decreases in speed and the direction of such changes. The device's provision of location and orientation data as set forth herein may be provided automatically to the computing device 110, other computing devices and combinations of the foregoing.

The perception system 172 also includes one or more components for detecting objects external to the vehicle such as other vehicles, obstacles in the roadway, traffic signals, signs, trees, etc. For example, the perception system 172 may include lasers, sonar, radar, cameras and/or any other detection devices that record data which may be processed by computing device 110. In the case where the vehicle is a small passenger vehicle such as a car, the car may include a laser or other sensors mounted on the roof or other convenient location.

The computing device 110 may control the direction and speed of the vehicle by controlling various components. By way of example, computing device 110 may navigate the vehicle to a destination location completely autonomously using data from the detailed map information and navigation system 168. Computing device 110 may use the positioning system 170 to determine the vehicle's location and perception system 172 to detect and respond to objects when needed to reach the location safely. In order to do so, computing device 110 may cause the vehicle to accelerate (e.g., by increasing fuel or other energy provided to the engine by acceleration system 162), decelerate (e.g., by decreasing the fuel supplied to the engine, changing gears, and/or by applying brakes by deceleration system 160), change direction (e.g., by turning the front or rear wheels of vehicle 100 by steering system 164), and signal such changes (e.g., by lighting turn signals of signaling system 166). Thus, the acceleration system 162 and deceleration system 160 may be a part of a drivetrain that includes various components between an engine of the vehicle and the wheels of the vehicle. Again, by controlling these systems, computing device 110 may also control the drivetrain of the vehicle in order to maneuver the vehicle autonomously.

FIGS. 2A-2D are examples of external views of vehicle 100. As can be seen, vehicle 100 includes many features of a typical vehicle such as headlights 202, windshield 203, taillights/turn signal lights 204, rear windshield 205, doors 206, side view mirrors 208, tires and wheels 210, and turn signal/parking lights 212. Headlights 202, taillights/turn signal lights 204, and turn signal/parking lights 212 may be associated with the signaling system 166. Light bar 207 may also be associated with the signaling system 166.

Vehicle 100 also includes sensors of the perception system 172. For example, housing 212 may include one or more laser devices for having 360 degree or narrower fields of view and one or more camera devices. Housings 216 and 218 may include, for example, one or more radar and/or sonar devices. The devices of the perception system may also be incorporated into the typical vehicle components, such as taillights 204 and/or side view mirrors 208. Each of these radar, camera, and lasers devices may be associated with processing components which process data from these devices as part of the perception system 172 and provide sensor data to the computing device 110.

These sensors of perception system 172 may detect objects in the vehicle's environment as well as characteristics of those objects such as their location, heading, size (length height and width), type, and approximate center of gravity. For example, the perception system may use the height of an object identified as a pedestrian (or human) to estimate the approximate center of gravity of the object. In this regard, the perception system may compare the characteristics of the object to known anthropomorphic data to determine an approximate center of gravity. For other object types, the approximate center of gravity may be determined from the characteristics of the object using various known statistical analyses. Data and information required for these determinations may be stored, for example, in memory 130 or a different memory of the perception system.

As discussed in more detail below, information from the perception system may be sent to various other systems in order to make decisions about when and how to deploy various safety mechanisms. In this regard, the perception system may send the information to the vehicle's computing devices which make such decisions and forward activation instructions to protection system 174 which deploys one or more safety mechanisms 176 in accordance with the activation instructions. In another example, the perception system 172 may forward the information directly to the protection system 174 which makes then determines whether and how to deploy one or more safety mechanisms 176.

Thus, the vehicle may also include a plurality of safety mechanisms 176. These safety mechanisms may be configured to reduce the likelihood of damage to objects outside of the vehicle as opposed to those meant to specifically protect passengers inside the vehicle. At least some of these safety mechanisms may be active, in that the device must be activated or deployed by a signal generated by one or more computing devices when an impact is imminent. In addition, at least some of these safety mechanisms may reduce the likelihood of damage to an object during or after a secondary impact.

These safety mechanisms may include groups of two or more airbags may be arranged at various positions around the autonomous vehicle where an impact is likely, such as at the front, back and sides of the autonomous vehicle. Each group of two or more airbags may be configured to have interlocking shapes as discussed above. As an example, the interlocking shapes may be arranged such that an airbag of a particular group overlaps at least one other airbag relative to an exterior surface of the vehicle. FIG. 3 is an example view 300 of a front end of vehicle 100 including a hood 302. In this example, hood 302 includes an airbag system 304 including a group of airbags 310-314. As shown, airbags 310-314 are not deployed. Of course, although only three airbags are included in the example airbag system 304 for simplicity, any number of additional interlocking airbags may also be deployed as discussed above. In addition, although only a front end of vehicle 100 is shown with an airbag system, as discussed above, additional airbag systems may be located on the sides and rear of vehicle 100 as well.

As with typical airbags, each of the airbags may include its own deployment mechanism which can be triggered by an electronic signal from one or more of the computing devices of the autonomous vehicle. This signal may trigger ignition of a gas generator propellant to rapidly inflate the airbag. Each airbag may also have its own vent to control the flow of gas out of the airbag after deployment.

In some examples, the airbags may also include structural supports. For instance, an airbag may have a skeleton of a superelastic material such as Nitinol or an internal cage of flexible elements such as cords or cables. This skeleton may help to spring out and retain the preferred deployment shape of an airbag.

Figure 4A:
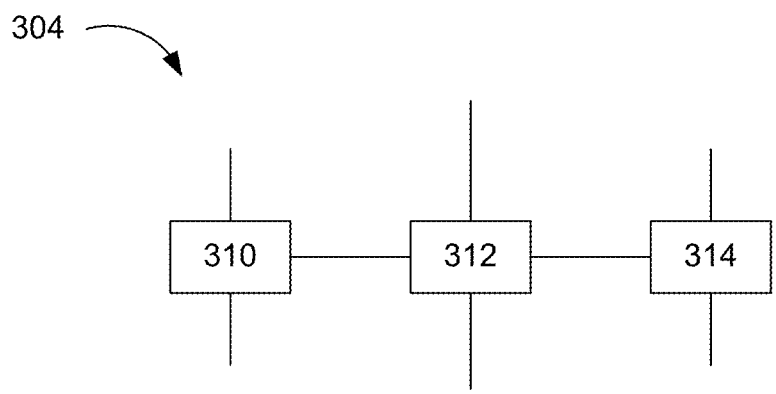
FIG. 4A-4F are examples of airbag systems in accordance with aspects of the disclosure.
Figure 4B:
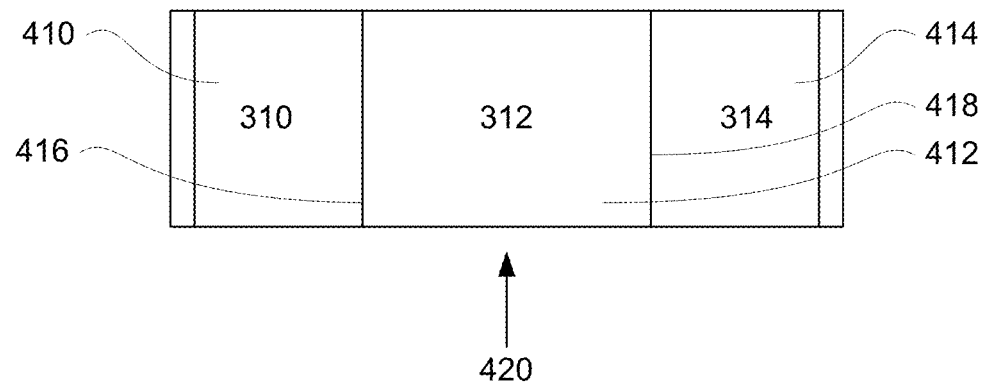
Figure 4C:
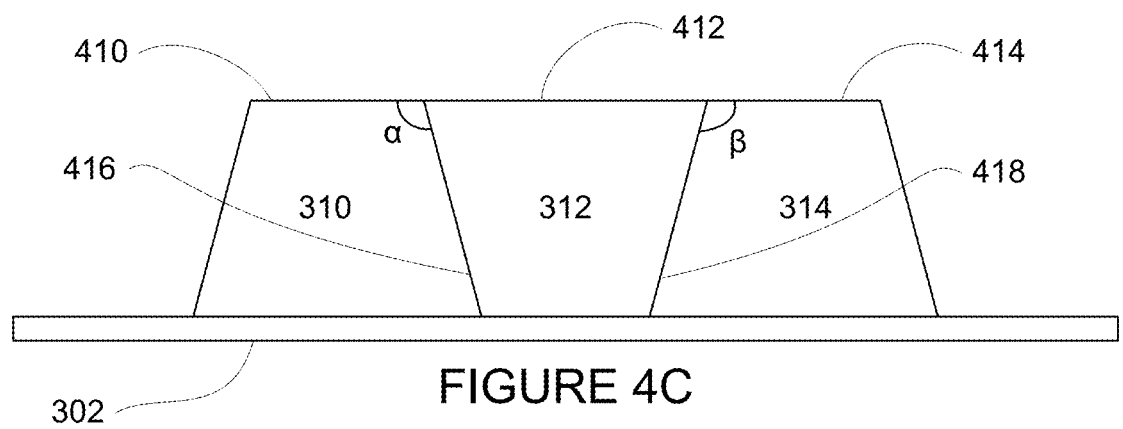

FIG. 4A is a further view of airbag system 304 including airbags 310-314 prior to deployment. FIGS. 4B and 4C are example views of a first configuration of airbag system 304 in a deployed configuration. FIG. 4B is the same perspective of FIG. 4A. FIG. 4C is a side view of airbag system 304 from the direction of arrow 420. In this regard, surfaces 410-414 are intended for contact with an object external to the vehicle. Edges 416 and 418 define the areas of contact between the airbags (shown as an edge in FIGS. 4B and 4C due to the perspective). Edge 416 is offset by an angle of α from the hood 302 and edge 418 is offset by an angle of β. These angles may range from greater than 0 degrees to less than 90 degrees, such as 30, 45, or 60 degrees. Because of this configuration, a person coming in contact with airbags 310-314 in the deployed configuration is unlikely to push between edges 416 and 418 and come in contact with the hood 302. As an example, if these angles were 90 degrees, an object which impacted the airbags at edge 416 or edge 418 may be able to push between the airbags causing further injury or damage to the object (than would have been caused by an impact with the airbag system alone) and possibly a collision with the hood 302.

Figure 4D:
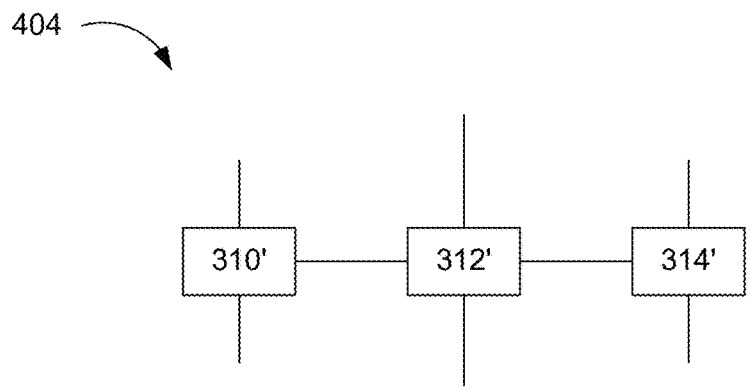
Figure 4E:
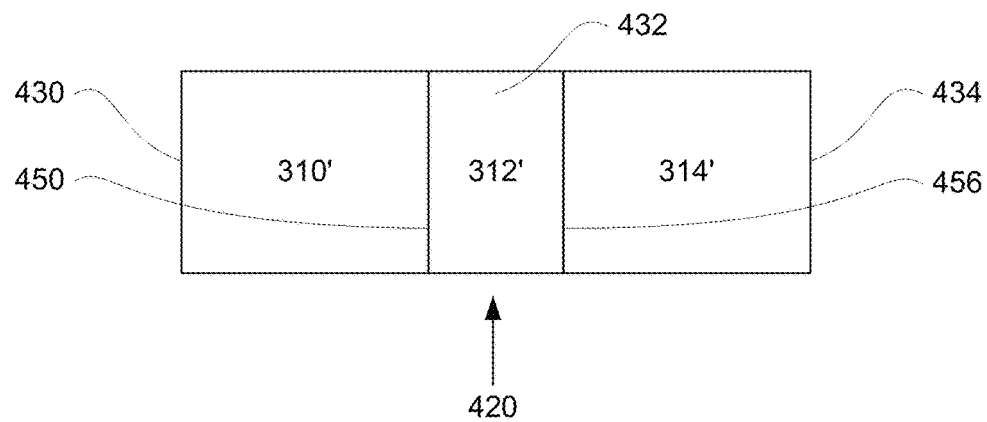
Figure 4F:
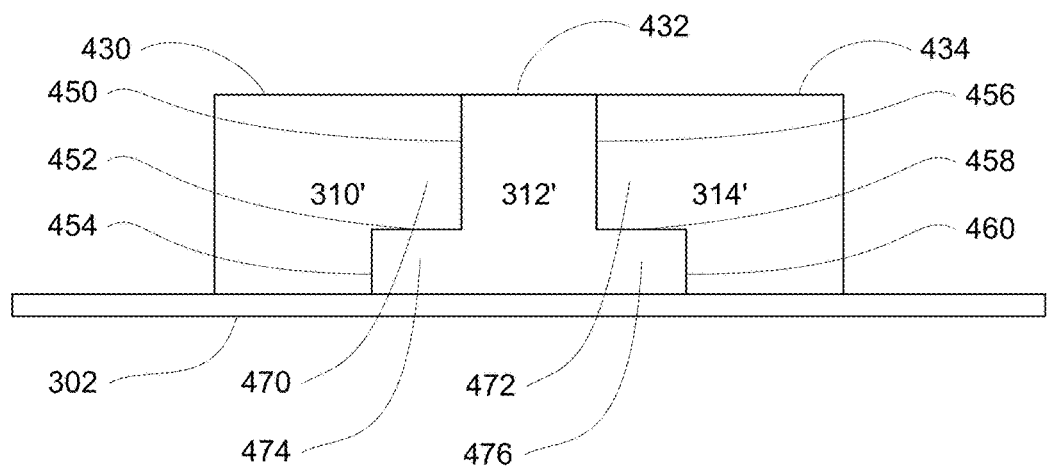

FIGS. 4D-4F are alternative example airbag system 404 including airbags 310'-314' prior to deployment. Airbags 310'-314' may be arranged similarly to the airbags 310-314 of airbag system 304 with respect to vehicle 100 as shown in FIG. 3. FIGS. 4E and 4F are example views of a second configuration of airbag system 404 in a deployed configuration. FIG. 4E is the same perspective of FIG. 4B. FIG. 4F is a side view of airbag system 404 from the direction of arrow 420. In this regard, surfaces 430-434 are intended for contact with an object external to the vehicle. Edges 450-460 define the areas of contact between the airbags (shown as an edge in FIGS. 4E and 4F due to the perspective). Edges 450-454 and 456-460, respectively, each form individual "step-like" shapes between the airbags. In this regard, each of airbags 310' and 314' includes a respective arm portion 470, 472 that overlaps with a respective leg portion 474, 476 of airbag 312'. Because of this configuration, a person coming in contact with airbags 310'-314' in the deployed configuration is unlikely to push between edges 450-454 or 456-460 and come in contact with the hood 302.

Although not shown, each of the airbags of airbag systems 304 and 404 may include one or more vents to allow air to be expelled from the airbag in order to "cushion" the object during an impact. In order to maintain the interlocking shape after full deployment when the airbags are venting the gas, the interlocking portions of the airbags may also include mechanisms to hold the interlocking portions to one another, such as tape, glue, hook and loop structures (such as Velcro®) or other sticky substances or connectors. These mechanisms may be arranged, for example, on all or a portion of the surfaces corresponding to edges 416 and 418 in the example of FIGS. 4B and 4C or 450-454 and 456-460 in the example of FIGS. 4E and 4F.

Because of the interlocking shapes of the airbags, in at least some examples, the airbags may be required to deploy in a particular sequence. This may allow the interlocking shapes to fit together like puzzle pieces as opposed to interfering (i.e. getting stuck before fully deploying) with one another during deployment. Thus, the airbags may be configured to deploy one at a time in sequence such that the interlocking airbags are fully inflated or deployed at approximately the same time, for example within a few milliseconds or more or less. For example, turning to the example first configuration of FIGS. 4B and 4C, in order to prevent surface 412 from interfering with airbags 310 and 314 during deployment, airbag 312 may need to be deployed a brief period of time before airbags 310 and 314 are deployed. Thus, to allow the airbags to properly interlock airbags 310-314 may be deployed in one of the particular sequences 312→310→314, 312→314→310, or 312→310 and 314. This allows the airbags in the second configuration to take on their interlocking shape as shown in FIG. 4C.

In the example second configuration of FIGS. 4E and 4F, in order to prevent the leg portions 474, 476 of airbag 312' from interfering with the arm portions 470, 472 of airbags 310' and 314' during deployment, airbags 310' and 314' may need to be deployed a brief period of time before airbag 312'. Thus, to allow the airbags to properly interlock airbags 310'-314' may be deployed in one of the particular sequences 310'→314'→312', 314'→310'→312', or 310' and 314'→312'. This allows the airbags in the second configuration to take on their interlocking shape as shown in FIG. 4F.

Figure 5A:
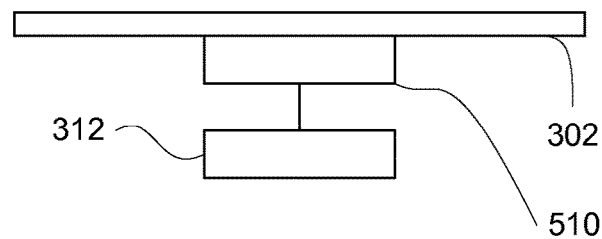
FIG. 5A-5C are examples of an airbag in accordance with aspects of the disclosure.
Figure 5B:
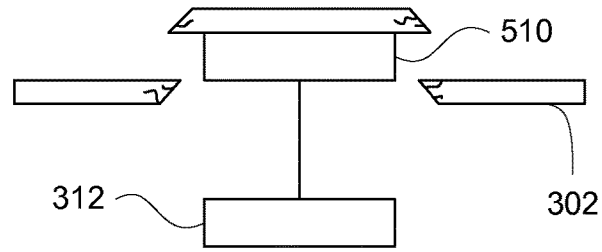
Figure 5C:
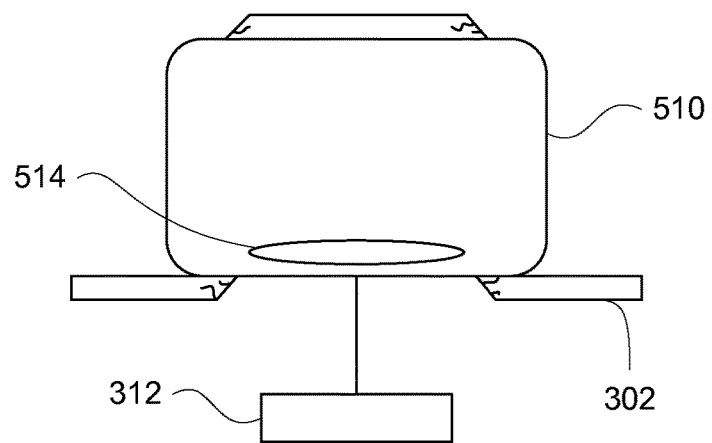

These airbag systems may be initially located beneath a surface of a vehicle for aesthetic reasons. In these examples, the hood of the vehicle may be configured to crumble or break away during or immediately before the active safety mechanism is activated. In one example, the hood may be a brittle shell that can be broken by the force of the active safety mechanism on an inner surface of the hood such as an airbag. For example, as shown in FIGS. 5A-5C, airbag 510, which may correspond to any of airbags 310-314 or 310'-314', is located beneath hood 302. FIG. 5A represents a default or rest location of the airbag 510. In FIG. 5B, prior to inflating the airbag 510, the airbag is pushed through the hood 302 breaking the brittle material into pieces. As shown in FIG. 5C, after passing through the hood 302, the airbag 510 may be inflated and vented through vent 514 in order to reduce the amount of damage or injury to an object during an impact. This brittle shell may include plastics (such as polyurethane skins, thermos polyurethane, or scored material with grooves which allow the surface of the front end to be broken.

Example Methods

In addition to the operations described above and illustrated in the figures, various operations will now be described. It should be understood that the following operations do not have to be performed in the precise order described below. Rather, various steps can be handled in a different order or simultaneously, and steps may also be added or omitted.

In addition, because of the nature of airbags, namely that they must be triggered to deploy and also take time to deploy, when airbags are placed on the exterior of a vehicle, external airbags need to be triggered before an impact with enough time for the airbag to fully deploy.

Figure 6:
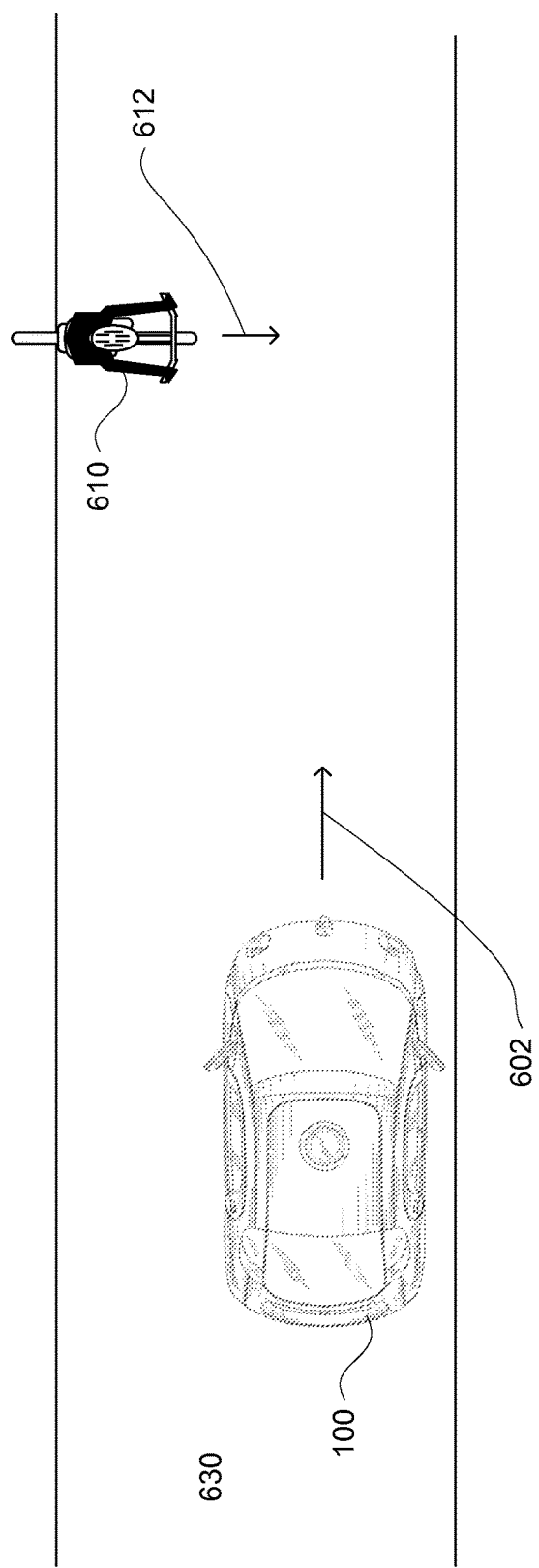
FIG. 6 is an example situational diagram in accordance with aspects of the disclosure.

Prior to deploying the safety mechanisms, vehicle's computing devices may use information from the vehicle's sensors to identify and track objects in the vehicle's environment. For example, one or more computing devices of the perception system may use information form the vehicle's sensors to detect and identify the characteristics (size, speed, shape, direction, object type, etc.) of various objects in the vehicle's environment. FIG. 6 is an example 600 bird's eye view of vehicle 100 as it drives along roadway 630 in the direction of arrow 602. In this example, the one or more computing devices of the perception system 172 may identify, among other things, the location and object type of bicyclist 610. After a brief period of tracking this object, the perception system 172 may determine the speed and heading of bicyclist 610 as shown by arrow 612.

Figure 7:
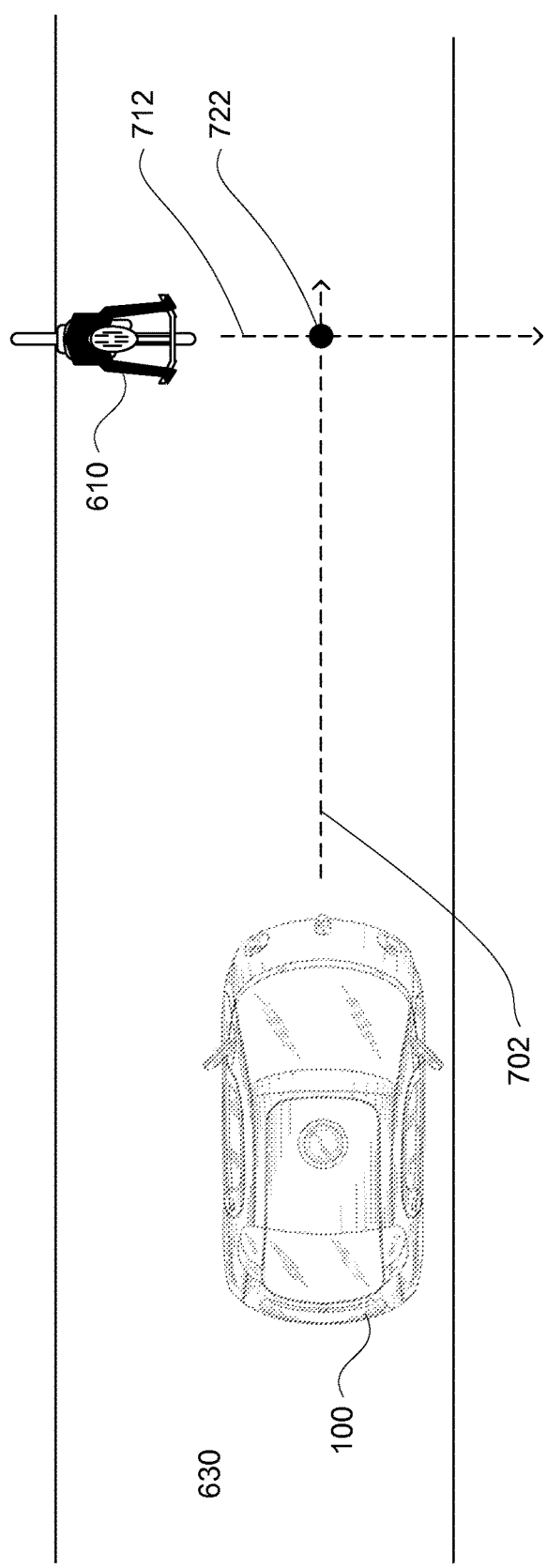
FIG. 7 is another example situational diagram in accordance with aspects of the disclosure.

In addition, the vehicle's computing devices may use the characteristics of the object, such as speed and heading, to predict future locations where the object will be. For example, as shown in example 700 of FIG. 7, trajectory lines 702 and 712 represent predicted future locations of vehicle 100 and bicyclist 610. Because the predicted future locations of these objects is just that, a prediction, predictions may quickly become less accurate the farther into the future they become.

The vehicle's computing devices may also determine whether the future locations indicate that the vehicle will collide with the object. For example, the perception system or computing device 110 may determine that an impact with bicyclist 610 is likely to occur at the locations of predicted impact point 722, respectively. Each of these impact points may be defined as a three-dimensional coordinate (x, Y, Z) in space such as latitude, longitude, and altitude or similar.

In most cases, if a collision is likely, the vehicle's computing devices may maneuver the vehicle in order to avoid the object. For example, computing device 110 may use the steering, acceleration and deceleration systems to maneuver vehicle 100 out of the path of bicyclist 610.

Figure 8:
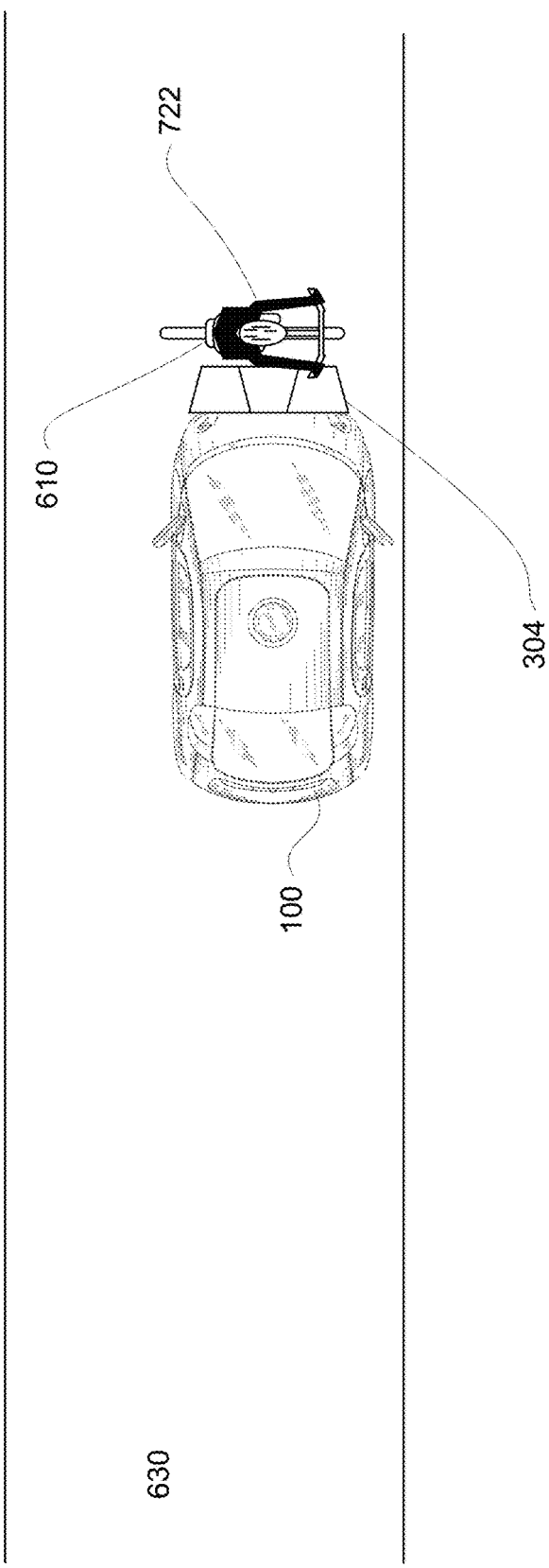
FIG. 8 is an example flow diagram in accordance with aspects of the disclosure.

However if there is not enough time to avoid the object, (i.e. not enough distance, not enough braking power, not enough room to go around or avoid etc.) the vehicle's computing devices may determine that an impact with the object is imminent. For example, an impact may be imminent, when an impact is predicted to occur within a predetermined period of time, such as a few seconds or more or less. When an impact is imminent, the vehicle's computing devices may send a signal to the protection system in order to deploy one or more of the active safety mechanisms. For example, the vehicle's computing devices may determine that the vehicle will not be able to safely maneuver out of the way in order to avoid bicyclist 610 before the bicyclist and vehicle reach impact point 722.

Where an autonomous vehicle's computing devices are able to determine that an impact is imminent, the autonomous vehicle's computing devices may work to deploy the airbags in advance of the impact. This may include sending signals to activate the airbags according to the particular sequences discussed above so that the interlocking airbags are fully inflated or deployed at approximately the same time as one another and at approximately the time when the impact is predicted to be. In this regard, the vehicle's computing devices may attempt to send signals such that the airbags will be fully deployed at the time of impact or within some acceptable period of time before the estimated time of the impact, such as a few milliseconds or more or less. Thus, the one or more computing devices may deploy interlocking airbags according to an expected deployment time for each airbag and an expected time of impact. For example, FIG. 8 is an example 800 of airbag system 304 in the fully deployed condition immediately before an impact with bicyclist 610 at impact point 722. Again, the interlocking nature of the airbag system 304 may prevent or reduce the likelihood that the bicyclist will pass between two of the airbags 310-314 and contact hood 302. As a result, the amount of injury to the bicyclist may be dramatically reduced as compared to an impact with the vehicle's hood.

Although the examples described herein are related to the use of vehicles when operating in autonomous driving modes, such features may also be useful for vehicles operating in manual or semi-autonomous modes or for vehicles having only manual driving mode and semi-autonomous driving modes. In such cases, an active safety mechanism may be identified as discussed above. However, when making the determination as to whether to deploy the active safety mechanism and/or control the vehicle as discussed above, the reaction time of the driver may be compared with the estimated time at which an impact with an object is expected to occur. Reaction times may be determined, for example, by monitoring a specific driver's reaction times over time or by using average or expected reaction times for drivers in general. If the reaction time is too slow, the vehicle's computing device may then use the estimated time when an update will be received to determine whether to deploy the active safety mechanism and, in the case of a vehicle with such capabilities to take control and maneuver the vehicle as discussed in the examples above.

Figure 9:
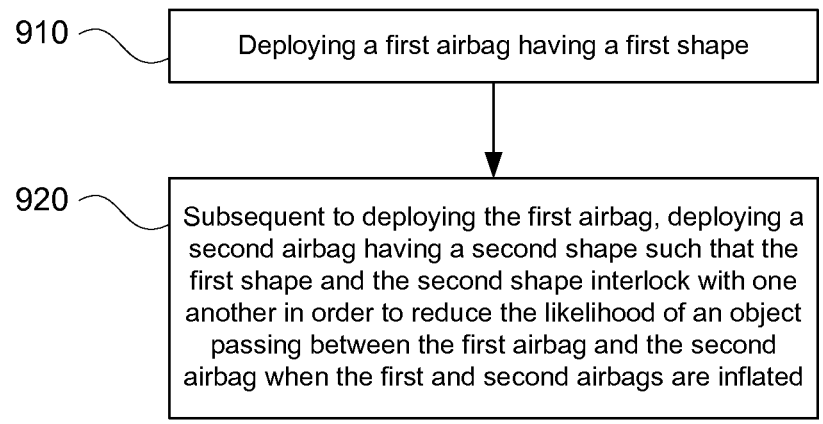
FIG. 9 is another example flow diagram in accordance with aspects of the disclosure.

FIG. 9 is an example flow diagram 900 in accordance with some of the aspects described above that may be performed by one or more computing devices such as the one or more server computing devices 110. For example, at block 910, a first airbag having a first shape is deployed. At block 920, subsequent to deploying the first airbag, deploying a second airbag having a second shape such that the first shape and the second shape interlock with one another in order to reduce the likelihood of an object passing between the first airbag and the second airbag when the first and second airbags are inflated. Of course, although only two airbags are included in the example flow diagram 900, any number of additional interlocking airbags may also be deployed as discussed above.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:
1. An airbag system for a vehicle, the system comprising:
a first airbag having a first shape; and second airbags each provided adjacent to the first airbag and each having a second shape such that the first shape and the second shapes are configured to interlock, overlap and make contact with one another, wherein the first airbag is deployed prior to the second airbags when an area of a surface of the first airbag configured to contact an object and oriented away from the vehicle is greater than an area of a surface of the first airbag oriented towards the vehicle and the first airbag is deployed after the second airbags when the area of the surface of the first airbag configured to contact the object and oriented away from the vehicle is less than the area of the surface of the first airbag oriented towards the vehicle.

2. The system of claim 1, wherein the first airbag and second airbags are arranged to deploy on an exterior of the vehicle.

3. The system of claim 1, further comprising one or more computing devices having one or more processors configured to:
   determine, using data from one or more sensors, that an impact with the object is likely to occur within a predetermined period of time; and
   use the determination to send a first signal to deploy the first airbag and second signals to deploy the second airbags.

4. The system of claim 3, wherein the first signal and second signals are sent according to a predetermined sequence such that the first signal and second signals are configured to cause the first airbag and second airbags to deploy at different times according to an expected deployment time for each of the first airbag and the second airbags.

5. The system of claim 4, wherein the first and second signals are further configured to cause the first airbag and the second airbags to be fully deployed within a predetermined amount of time from one another.

6. The system of claim 3, wherein the one or more processors are further configured to:
   determine, using the data from one or more sensors, an estimated time of the impact, and
   wherein the first signal and the second signals are configured to cause the first airbag and the second airbags to be fully deployed within a predetermined amount of time of the estimated time of the impact.

7. The system of claim 1, wherein portions of the first airbag and the second airbags are configured to overlap one another relative to an exterior surface of the vehicle in order to prevent the object from passing between the first airbag and the second airbag and hitting the exterior surface of the vehicle when the first and second airbags are inflated.

8. The system of claim 7, wherein an overlapping portions of the first airbag and the second airbags include a connection mechanism configured to hold the overlapping portions to one another when the airbags are inflated and when the airbags are deflating after inflating.

9. The system of claim 1, further comprising the vehicle.

10. A method for deploying an airbag system for a vehicle, the method comprising:
    deploying a first airbag having a first shape prior to second airbags each provided adjacent to the first airbag and each having a second shape such that the first shape and the second shapes interlock, overlap and make contact with one another when an area of a surface of the first airbag configured to contact an object and oriented away from the vehicle is greater than an area of a surface of the first airbag oriented towards the vehicle;
    deploying the first airbag after the second airbag when the area of the surface of the first airbag configured to contact the object and oriented away from the vehicle is less than the area of the surface of the first airbag oriented towards the vehicle.

11. The method of claim 10, wherein the first airbag and second airbags are arranged to deploy on an exterior of the vehicle.

12. The method of claim 11, wherein the first air-bag and the second airbags are deployed such that portions of the first airbag and the second airbags are configured to overlap one another relative to an exterior surface of the vehicle in order to prevent the object from passing between the first airbag and the second airbags and hitting the exterior surface of the vehicle when the first and second airbags are inflated.

13. The method of claim 12, wherein an overlapping portions of the first airbag and the second airbags include a connection mechanism configured to hold the overlapping portions to one another when the airbags are inflated and when the airbags are deflating after inflating and wherein the connection mechanism includes an adhesive.

14. The method of claim 10, further comprising:
    determining, by one or more processors, using data from one or more sensors, that an impact with the object is likely to occur within a predetermined period of time; and
    using, by the one or more processors, the determination to send a first signal in order to deploy the first airbag and second signals in order to deploy the second airbags.

15. The method of claim 14, wherein the first signal and second signals are sent according to a predetermined sequence such that the first signal and second signals are configured to cause the first airbag and second airbags to deploy at different times according to an expected deployment time for each of the first airbag and the second airbags.

16. The method of claim 15, wherein the first and second signals are deployed in order to cause the first airbag and the second airbags to be fully deployed within a predetermined amount of time from one another.

17. The method of claim 14, further comprising:
    determining, by the one or more processors, using the data from one or more sensors, an estimated time of the impact, and
    wherein the first signal and the second signals are configured to cause the first airbag and the second airbags to be fully deployed within a predetermined amount of time of the estimated time of the impact.

18. A non-transitory computer readable medium on which instructions are stored, the instructions when executed by one or more processors, cause the one or more processors to perform a method, the method comprising:
    deploying a first airbag having a first shape prior to second airbags each provided adjacent to the first airbag and each having a second shape such that the first shape and the second shapes interlock, overlap and make contact with one another when an area of a surface of the first airbag configured to contact an object and oriented away from the vehicle is greater than an area of a surface of the first airbag oriented towards the vehicle;
    deploying the first airbag after the second airbag when the area of the surface of the first airbag configured to contact the object and oriented away from the vehicle is less than the area of the surface of the first airbag oriented towards the vehicle.

19. The medium of claim 18, wherein the method further comprises:

determining using data from one or more sensors, that an impact with the object is likely to occur within a predetermined period of time; and using the determination to send a first signal to deploy the first airbag and second signals to deploy the second airbags.

20. The medium of claim 19, wherein the first signal and second signals are sent according to a predetermined sequence such that the first signal and second signals are configured to cause the first airbag and second airbags to deploy at different times according to an expected deployment time for each of the first airbag and the second airbags.

* * * * *